United States Patent [19]
Langos et al.

[11] Patent Number: 5,256,049
[45] Date of Patent: Oct. 26, 1993

[54] STORAGE HEAD FOR A BLOW MOLDING MACHINE

[75] Inventors: Peter Langos, St. Augustin; Manfred Lehmann, Cologne, both of Fed. Rep. of Germany

[73] Assignee: Mauser-Werke GmbH, Bruehl, Fed. Rep. of Germany

[21] Appl. No.: 828,977

[22] PCT Filed: May 28, 1991

[86] PCT No.: PCT/EP91/00985

§ 371 Date: Mar. 3, 1992

§ 102(e) Date: Mar. 2, 1992

[87] PCT Pub. No.: WO91/18732

PCT Pub. Date: Dec. 12, 1991

[30] Foreign Application Priority Data

Jun. 1, 1990 [DE] Fed. Rep. of Germany ....... 4017699

[51] Int. Cl.⁵ .................................................. B29C 47/20
[52] U.S. Cl. ................................. 425/131.1; 425/381; 425/467; 425/532
[58] Field of Search ............... 425/532, 131.1, 133.1, 425/467, 523, 381

[56] References Cited

U.S. PATENT DOCUMENTS

| | | | |
|---|---|---|---|
| 3,909,183 | 9/1975 | Hsu | 425/532 X |
| 3,985,490 | 10/1976 | Kader | 425/381 |
| 4,063,865 | 12/1977 | Becker | 425/467 |
| 4,182,603 | 1/1980 | Knittel | 425/133.1 |
| 4,201,532 | 5/1980 | Cole | 425/467 X |
| 4,305,902 | 12/1981 | Uhlig | 425/532 X |
| 4,422,838 | 12/1983 | Iwawaki et al. | 426/467 X |
| 4,424,178 | 1/1984 | Daubenbüchel et al. | 425/381 X |
| 4,548,569 | 10/1985 | Pitigliano et al. | 425/133.1 |
| 4,609,340 | 9/1986 | Irwin et al. | 425/532 |
| 4,731,216 | 3/1988 | Topolski | 425/523 X |
| 4,802,833 | 2/1989 | Shapler | 425/131.1 |
| 5,116,215 | 5/1992 | Hsu | 425/381 |

FOREIGN PATENT DOCUMENTS

| | | |
|---|---|---|
| 1964675 | 12/1969 | Fed. Rep. of Germany . |
| 2046334 | 3/1972 | Fed. Rep. of Germany . |
| 2239987 | 2/1974 | Fed. Rep. of Germany . |
| 3000444A1 | 7/1981 | Fed. Rep. of Germany . |
| 3026822A1 | 1/1982 | Fed. Rep. of Germany . |
| 3623308 | 1/1988 | Fed. Rep. of Germany ...... 425/532 |
| 55-90329 | 7/1980 | Japan ................................. 425/532 |
| 59-85720 | 5/1984 | Japan . |

*Primary Examiner*—Richard L. Chiesa
*Attorney, Agent, or Firm*—Pennie & Edmonds

[57] ABSTRACT

The invention relates to a storage head for a blow moulding machine for discontinuous manufacture of multi-layer co-extruded and blow-moulded hollow bodies made of thermoplastic. To improve the product quality and to increase the throughput, each distributor element is designed as a spiral channel distributor (20) which distributes the individual molten plastic streams uniformly at the periphery. The ejector (14) consists of at least two concentric tubular pieces (42, 44) and the peripherally distributed plastic flows from the ejector (14) through an annular gap (46) into the storage space (16) in the storage head housing (10) below the ejector.

5 Claims, 1 Drawing Sheet

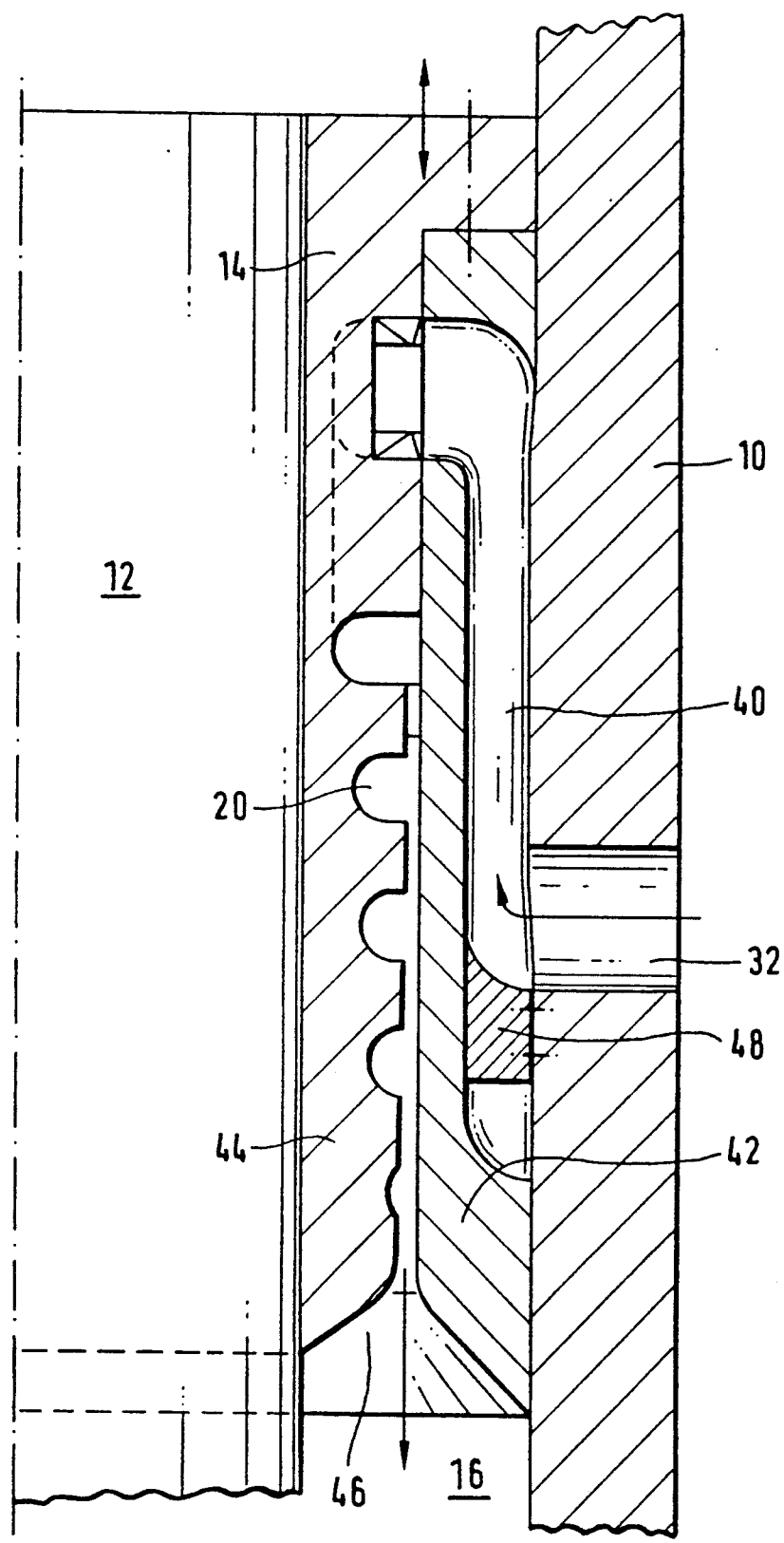

STORAGE HEAD FOR A BLOW MOLDING MACHINE

BACKGROUND OF THE INVENTION

The invention relates to a storage head for a blow molding machine for the discontinuous production of plastic hollow bodies, comprising at least one extruder, connected to the storage-head housing, for feeding at least one liquid plastic melt into the storage head; a centrally disposed shaft; and a distributor element, formed as a spiral channel and enclosing the shaft concentrically, to distribute the plastic melt over a circular circumference and conducting it into an annular storage space underneath the ejector piston, which is mounted in the storage-head housing so as to be movable axially, and by means of which the plastic melt stored in the storage space can be ejected by an annular nozzle gap which connects underneath to the storage space.

A comparable storage head is previously known, e.g., from the DE-OS 30 00 444, and is described in detail there. The spiral-channel distributor to distribute the liquid plastic melt is here disposed on the outside wall of the ejector piston. The spiral-shaped channel is supplied with liquid plastic melt through two axial grooves that are disposed in the outside wall of the ejector piston above the spiral channel. These axial grooves are connected to appropriate radial borings in the storage housing so as to feed in material from the extruder. A disadvantage here is that, when the plastic is distributed over the circumference, such that the storage space is filled up and the ejector piston moves slowly and steadily into its upper ejector position, the spiral-channel distributor is bounded by two outside walls that move relative to one another, and the inflowing plastic material is constantly subject to a shear effect. Furthermore, during the ejection process, there is no defined ejector edge present at the outside circumference of the ejector piston, so that the entire plastic ring column in the storage space adheres on its outside to the inside wall of the storage housing and is not ejected uniformly over the entire cross-section but rather is displaced to the outside in the manner of a wedge, adheres to the storage housing, and is sheared off or smeared off. This causes undesirable material displacements and excessive internal friction as well as a non-uniform pressure build-up within the liquid melted plastic material. The result is a disturbed layer build up in the hose-shaped parison that is ejected through the annular-gap nozzle of the storage head, or in the blown plastic hollow body or in the end product.

These disadvantages should be avoided.

SUMMARY OF THE INVENTION

It is consequently an object of the present invention to improve the quality of the blown hollow bodies, such as, e.g., barrels or canisters, and for this purpose to create a favorable layer build-up with multiple overlaps of the plastic material in the storage head through a distributor element that is designed as a spiral-channel distributor, and to be able to eject this plastic ring column completely and uniformly without disturbing the interior layer build-up.

According to the invention, this object is achieved as follows: The ejector piston is formed of at least two cylindrical tubular pieces, and the spiral channels of the spiral-channel distributor are formed on one tubular piece and are covered by the other tubular piece, such that the plastic which is distributed on the circumference of the cylinder exits from a annular gap that is formed on the front face in the ejector piston.

By constructing the ejector piston in this favorable fashion, the spiral-channel distributor is formed, so to speak, within the ejector piston itself with a stationary outer boundary of the spiral-channel gap. The plastic material is uniformly distributed along the circumference and it flows into the storage space on the front side from the oscillating ejector piston and the distributor space of the spiral-channel distributor is not formed by boundary walls that are in constant relative motion with respect to one another. A shear effect and internal friction on the plastic material is thus already avoided when the material is distributed along the circumference. Furthermore, the same conditions prevail for the ejector piston itself. The storage space is bounded by the ejector piston in the circumferential direction completely smoothly and at about the same height on both sides (outside wall of the shaft and inside wall of the storage-head housing as well as the lower inside edge and outside edge of the ejector piston). Thus, no non-uniform shear surfaces are present even during the ejection process, and no non-uniform shear forces can act on the stored plastic material.

Through the spiral-channel distributor that is disposed in the ejector piston, the liquid melted plastic is advantageously distributed over the circumference in several thin layers that alternately are superposed or overlapped; this favorable layer build-up is not disturbed when the material is distributed in the distributor space and when it is ejected from the storage space. Thus, the blown product is free from the undesirable formation of striations, and the material or the individual layers are welded together not only on radial borders over the wall thickness or a narrow overlapping area, but in several thin layers over the entire circumference. This considerably improves the product quality of the blown hollow body.

For technical and production reasons, it may be advantageous here for the outer and/or inner cylindrically shaped tubular piece of the ejector piston to be formed in two shells, i.e. to consist of two shell halves.

It is a special feature of the invention that the spiral-channel distributor is formed on the outside wall of the inside tubular piece or/and on the inside wall of the outer tubular piece of the ejector piston. Here, the length of the distributor element or of the individual spiral channels in the axial direction is about the same as the diameter of the tubular piece on which the spirals are formed. With this storage head for a blow molding machine for the discontinuous production of plastic hollow bodies and with this distributor element that is designed as a spiral-channel distributor, the same rheological flow properties are given for all plastic particles and improved overlap and distribution of the melt streams in the distributor element is achieved while simultaneously increasing the throughput power and the production speed.

The spiral-channel distributor can be compared to a multiple-start thread or spiral channel with a particular pitch, that is formed on the outside wall of the inside tubular piece or on the inside wall of the outside tubular piece. The spiral channels are always fed individually, and their depth decreases continuously in the flow direction. In this way, the plastic streams present in the spirals are gradually brought over into axial streams.

The axial streams form as circumferential shells in the enlarging gap between the spiral-channel distributor and the sheath which covers it. The axially outflowing streams of melt from the individual spiral channels always overlap the residual axial streams of melt which flow underneath and which flow in the spiral channels.

A special development of the invention provides that the spirals of the spiral-channel distributor are supplied with liquid melted plastic at least along one longitudinal groove. Here, the longitudinal groove is disposed at about the same height as the spirals, and the longitudinal groove stands in a material flow connection, underneath with the extruder by way of a radial boring, and above with the beginning of the spirals. Here, the liquid melted plastic material is thus conducted through two or four laterally disposed infeed grooves, directly through the storage-head housing-wall, to the beginning or the start of the individual channels in the ejector piston. Because the longitudinal grooves are disposed at about the same height as the spirals, and because the longitudinal grooves stand in a material flow connection, underneath with the extruder by way of a radial boring, and above with the beginning of the spirals, the structural height of the distributor element is advantageously shortened.

The inventive spiral-channel distributor achieves the following advantages:
- far-reaching overlap of the individual melt streams or layers with only one melt distributor,
- overlap length beyond half the circumference up to about 240° in the circumferential direction (important for welding the individual streams; in the case of a design with, e.g., six spirals and 240° overlap length, this leads to four-fold overlap)
- the same rheological flow properties hold for all melt streams,
- a significant increase of throughput power is possible with the inventive spiral-channel distributor, in comparison with conventional distributor elements such as, e.g., a thread-shaped distributor (e.g. a 20 l head storage can achieve an increase of throughput power from 650 kg/h to about 800 kg/h while simultaneously improving the all-around distribution of the plastic material).

BRIEF DESCRIPTION OF THE DRAWING

The invention is explained and described in more detail below, in terms of an embodiment which is schematically shown in the drawing.

DESCRIPTION OF THE PREFERRED EMBODIMENTS

In the drawing, a storage-head housing of an inventive storage head with a spiral-channel distributor is designated by the reference number 10. Here, the ejector piston 14 consists of two concentric tubular pieces 42 and 44. The outer wall of the inner tubular piece 44 is equipped with the spirals 20 of the spiral-channel distributor. These spirals decrease in depth, and the gap between the two tubular pieces 42 and 44 becomes wider. For operation, the two tubular pieces 42 and 44 are rigidly connected together.

Two or four diametrically opposite borings 32 are situated in the housing wall 10 of the storage head. Through appropriate pipelines, they are connected to at least one extruder to supply the liquid melted plastic. In the representation that is shown in the drawing, the ejector piston 14 has reached its uppermost position; here, the lower end of the longitudinal groove 40, which is formed in the outer wall of the outer tubular piece 42, goes over directly into the radial boring 32 in the housing wall 10 of the storage-head housing. The length of the axial groove 40 corresponds approximately to the length of the ejection stroke of the ejector piston 14. In its lowermost ejection position, the upper end of the longitudinal groove 40 is situated almost directly in front of the radial boring 32.

The liquid melted plastic material supplied by the extruder flows through the boring 32 and through the longitudinal groove 40 towards the top. There it passes through a boring in the radial direction above the spiral-channel distributor into the inner tubular piece 44. Here, a spiral can be fed directly, or two spirals can be supplied with plastic material simultaneously through a divider channel that is bounded in the circumferential direction and that runs horizontally.

At first, the main stream of the plastic material flows in the individual spirals in helical fashion in the direction of the spirals. However, at the same time, a portion of the plastic melt to an increasing degree "overflows" in shell-like fashion in the circumferential and axial directions from the individual spirals, and overlaps in shell-like fashion. Finally, the plastic material, which is uniformly distributed over the entire circumference, exits at the front between the two tubular pieces 42 and 44 from the spiral-channel distributor and passes into the storage space 16 which is situated below the ejector piston 14.

A clearance hook 48 may be provided in each of the longitudinal grooves 40, below the radial boring, so as to be rigidly connected to the housing wall 10. This clearance hook prevents the plastic material from depositing in the longitudinal groove that is situated underneath the boring 32, so as to separate itself from the continuous stream of melt, and from being pressed out again only during the next filling process of the storage space.

In a modification of the invention, the longitudinal groove 40 can just as well be formed on the inner wall of the storage-head housing 10, so that the liquid melted plastic material reaches the beginning of the spirals or the spiral-channel distributor only through a boring in the outer ring piece 42. The spirals 20 of the spiral-channel distributor here could also be disposed on the cylindrical inside surface of the outer tubular piece 42.

In another design of the invention, it is likewise conceivable that the liquid melted plastic material is conducted centrally, e.g. through the central piece or the shaft 12, on which the ejector piston 14 is mounted so as to be axially movable. After this, it can be conducted through appropriate star-shaped borings and through longitudinal grooves connecting thereto, as stroke equalization, into the spiral-channel distributor that is situated inside the ejector piston.

It is likewise possible to dispose the spirals of the spiral-channel distributor on the outer wall of the inner tubular piece 44 and, formed in appropriately similar fashion, also on the inner wall of the outer tubular piece 42. For production engineering, it is then advantageous, in some circumstances, if the outer tubular piece 42 consists of two hemi-shells.

It is always essential for the design of the spiral channels that the individual spirals are disposed at some distance from one another, such that their average distance has about the same axial width as the width of one spiral groove, and the width of the spiral grooves increases slowly but steadily with increasing length. Here, the cylindrical area that lies in between increases and becomes broader correspondingly. The spiral grooves are bounded laterally by defined edges, such that the lower edge or the cylindrical surface that connects below is always set back a little, so that the plastic stream can flow over from the spiral groove into the cylindrical circumferential surface.

The above description makes clear that, by means of the inventive design of a storage-head housing with a spiral-channel distributor, plastic hollow bodies can be produced with improved product quality while simultaneously increasing the production speed.

We claim:

1. A storage head for a blow molding machine for the discontinuous production of plastic hollow bodies, comprising: at least one extruder, connected to the storage-head housing, for feeding at least one molten plastic melt into the storage head; a centrally disposed shaft; and a distributor element, formed as a spiral channel and enclosing the shaft concentrically, to distribute the plastic melt over a circular circumference and conducting it into an annular storage space underneath an ejector piston, which is mounted in the storage-head housing so as to be movable axially, and by means of which the plastic melt accumulated in the storage space can be ejected intermittently by an annular nozzle which connects underneath to the storage space, wherein the ejector piston (14) is formed of at least two cylindrical tubular pieces (42, 44), and the spiral channels of the spiral-channel distributor (20) are formed on one said tubular piece (42, 44) and are covered by another said tubular piece (44, 42), whereby the depth of the spirals of the spiral-channel distributor (20) decreases and the gap between the two tubular pieces (42, 44) becomes broader, in order to distribute the plastic melt along the circumference, and such that the plastic melt which is distributed on the circumference of the cylindrical pieces exits from an annular gap (46) that is formed on the front face in the ejector piston (14), so as to enter into the storage space (16).

2. The storage head of claim 1, wherein the outer and/or inner cylindrical tubular piece (42, 44) of the ejector piston (14) is formed in two shells or in two parts.

3. The storage head of claim 1, wherein the spiral-channel distributor (20) is formed on the outer wall of the inner tubular piece (44) and/or on the inner wall of the outer tubular piece (42) of the ejector piston.

4. The storage head of any one of claims 1, 2 or 3, wherein the spirals of the spiral-channel distributor (20) are supplied with liquid melted plastic material through at least one longitudinal groove (40), such that the longitudinal groove (40) is disposed at about the same height as the spirals, and the longitudinal groove (40) has a material-flow connection below, through a radial boring (32) in the storage-head housing (10), to the extruder, and above to the beginning of the spirals.

5. The storage head of claim 1, wherein the spiral-channel distributor (20) is formed on the outer wall of the inner tubular piece (44) and covered by the inner wall of the outer tubular piece.

* * * * *